US008666645B2

(12) United States Patent
Saunders

(10) Patent No.: US 8,666,645 B2
(45) Date of Patent: Mar. 4, 2014

(54) METHOD OF SELECTING A TRAFFIC PATTERN FOR USE BY A NAVIGATION SYSTEM

(75) Inventor: Mark Saunders, Naperville, IL (US)

(73) Assignee: Navteq B.V., Veldhoven (NL)

( * ) Notice: Subject to any disclaimer, the term of this patent is extended or adjusted under 35 U.S.C. 154(b) by 43 days.

(21) Appl. No.: 13/332,781

(22) Filed: Dec. 21, 2011

(65) Prior Publication Data

US 2013/0166187 A1 Jun. 27, 2013

(51) Int. Cl.
*G01C 21/34* (2006.01)

(52) U.S. Cl.
USPC .......... 701/117

(58) Field of Classification Search
USPC .......... 701/117
See application file for complete search history.

(56) References Cited

U.S. PATENT DOCUMENTS

| | | | | |
|---|---|---|---|---|
| 6,480,783 | B1 * | 11/2002 | Myr | 701/117 |
| 7,096,115 | B1 * | 8/2006 | Groth et al. | 701/117 |
| 7,855,659 | B2 * | 12/2010 | Saunders | 340/905 |
| 7,894,980 | B2 * | 2/2011 | Liu et al. | 701/118 |
| 7,899,611 | B2 * | 3/2011 | Downs et al. | 701/117 |
| 7,990,284 | B2 | 8/2011 | Saunders | 340/905 |
| 2006/0122846 | A1 * | 6/2006 | Burr et al. | 705/1 |
| 2007/0208497 | A1 * | 9/2007 | Downs et al. | 701/117 |
| 2008/0046165 | A1 * | 2/2008 | Downs et al. | 701/117 |
| 2008/0071465 | A1 * | 3/2008 | Chapman et al. | 701/117 |
| 2010/0151838 | A1 | 6/2010 | Wormald et al. | |
| 2010/0292997 | A1 * | 11/2010 | Saunders | 705/1.1 |

FOREIGN PATENT DOCUMENTS

| | | | |
|---|---|---|---|
| DE | 10 2005 055244 | 5/2007 | |
| WO | WO2009/053405 | 4/2009 | G01C 21/32 |

OTHER PUBLICATIONS

Chao Long et al., "Wireless Sensor Networks: Traffic Information Providers for Intelligent Transportation Systems", Geoinformatics, 2010 18th International Conference on, IEEE, Piscataway, NJ, USA, Jun. 18, 2010, pp. 1-5.

Thomas Strang et al., "Vehicle Networks", Universitat Innsbruck, URL: http://www.sti-innsbruck.at/fileadmin/documents/vn-ws0809/07-VN-BroadcastSystems.pdf., Nov. 10, 2008, pp. 1-47.

"Intelligent Transport Systems (ITS); V2V Application; Part 1: Co-operative Awareness Application; Part 1: Co-operative Awareness Application (CAA)", European Telecommunications Standards Institute (ETSI), France, No. V1.3, Jun. 16, 2011, pp. 1-45.

M. Papageorgiu: "Concise Encyclopedia of Traffic & Transportation Systems", Elsevier Science Ltd., The Netherlands, Dec. 31, 1999, pp. 461-468, XP002691120.

International Search Report and Written Opinion for related Application No. PCT/EP2012/073020, mailed Feb. 12, 2013.

* cited by examiner

*Primary Examiner* — Thomas Tarcza
*Assistant Examiner* — Alex C Dunn
(74) *Attorney, Agent, or Firm* — Lempia Summerfield Katz LLC

(57) ABSTRACT

A method for selecting a traffic pattern for use by a navigation system is disclosed. When unusual traffic conditions exist, a message is sent to the navigation system. The message includes a code that identifies a traffic pattern. The navigation system uses the code to select a traffic pattern to use when calculating a route or to provide other navigation system functions.

7 Claims, 7 Drawing Sheets

METHOD OF SELECTING A TRAFFIC PATTERN FOR USE BY A NAVIGATION SYSTEM

FIELD

The present invention relates generally to providing navigation functions, and more particularly, relates to selecting a traffic pattern for use by a navigation system.

BACKGROUND

Navigation systems are available that provide users with various navigation-related functions. For example, some navigation systems are able to determine an optimum route to travel by roads between locations in a geographic region. Using input from the user, and optionally from equipment that can determine the user's physical location (such as a GPS system), a navigation system can examine various routes between two locations to determine an optimum route to travel from a starting location to a destination location in a geographic region.

To calculate an optimal route, the navigation system uses a routing algorithm. A routing algorithm searches for the route having the minimum cost. Here, cost refers to a user's preference for a route. For example, the user may desire the shortest route, the fastest route, or the most energy efficient route for traveling from an origin to a destination.

The routing algorithm uses data in a geographic database to calculate the route. The geographic database contains data that represents some of the physical geographic features in a geographic region. For example, the geographic database represents a road network using road segments and nodes. If the routing algorithm is calculating a minimum time route, the routing algorithm may retrieve road segment length and speed limit data from the geographic database. The cost per segment is the travel time, which is calculated by dividing the segment length by the speed limit associated with the segment.

To improve the minimum time route calculation, the routing algorithm may use traffic data. Some navigation systems have a database of historical traffic data, such as NAVTEQ's Traffic Patterns™ product. The historic traffic database includes data representing typical traffic speeds on roads organized by day of the week and time of the day. Route calculation using a historic traffic database is likely to be more accurate than calculating a route using speed limits or speed ranges to estimate the speed of traffic.

Route calculation using real-time traffic data is likely to be more accurate than calculating a route using a historic traffic database. In some areas, systems broadcast data messages that contain up-to-the-minute reports of traffic and road condition information. These systems broadcast the traffic data over traffic message channels on a continuous, periodic, or frequently occurring basis. Traffic message receivers decode the data and provide up-to-the-minute reports of traffic and road conditions.

One protocol for broadcasting traffic messages is the Traffic Message Channel (TMC), which is used in Europe, North America, and elsewhere. In Europe TMC is broadcast as part of the Radio Data System (RDS) and North America TMC is broadcast as part of the Radio Broadcast Data System (RBDS). Essentially RDS and RBDS are identical. Another traffic broadcast system, named Vehicle Information and Communication System ("VICS") Center, is used in Japan. Traffic and road condition information can also be transmitted using other protocols (such as Traffic Experts Protocol Group (TPEG)) and on other broadcast bearers including Digital Audio Broadcasting ("DAB"), Digital Multimedia Broadcasting ("DMB"), Hybrid Digital Radio ("HD Radio"), Digital Radio Mondiale (DRM), satellite radio, and other protocols and radio systems, such as MSN-Direct.

Some systems may transmit real-time traffic data directly to an end-user device. For example, the system may use non-broadcast transmissions, such as General Packet Radio Service (GPRS), Time Division Multiplexing (TDM), or other direct wireless transmission.

SUMMARY

A method for selecting a traffic pattern for use by a navigation system is disclosed. The method includes receiving information regarding abnormal traffic conditions. The method also includes identifying a traffic pattern that approximates the abnormal traffic conditions. The traffic pattern is associated with a code. The method further includes transmitting a message that includes the code associated with the traffic pattern. Transmitting the message with the traffic pattern code reduces transmission costs.

A method for using a transmitted traffic pattern code is also disclosed. The method includes receiving a message including a code identifying a traffic pattern and a period of validity. During the period of validity, the receiving device uses the traffic pattern associated with the code to perform navigation system functions providing increased accuracy in route and time calculations.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

I. Traffic Broadcast System Overview

Figure 1:
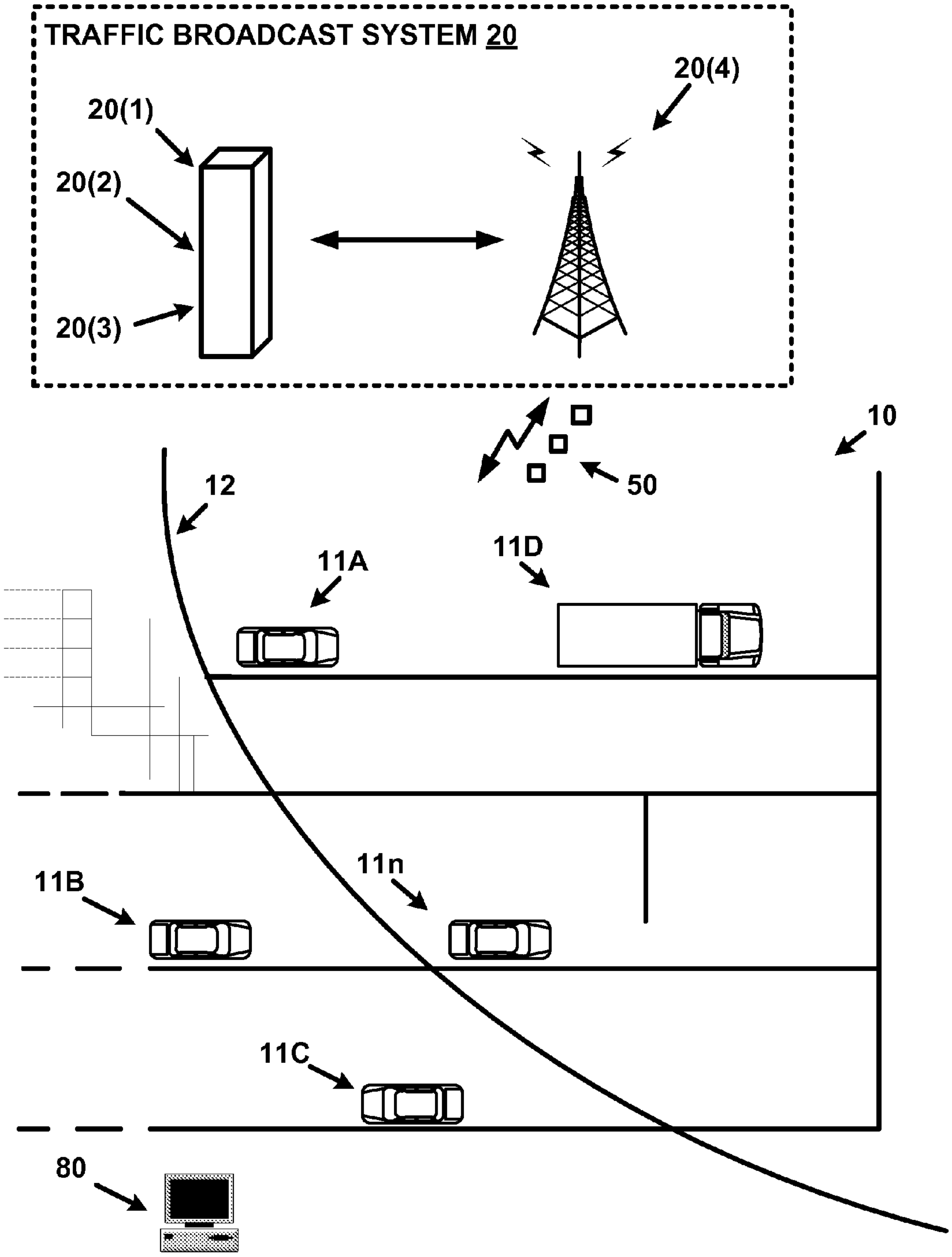
FIG. 1 is diagram illustrating components of a traffic broadcast system in a geographic region, according to an example.

FIG. 1 is diagram illustrating a geographic region 10. The region 10 may be a metropolitan area, such as the New York metropolitan area, the Los Angeles metropolitan area, or any other metropolitan area. Alternatively, the region 10 may be a state, province, or country, such as California, Illinois, France, England, or Germany. Alternatively, the region 10 can be a combination of one or more metropolitan areas, states, countries, and so on. Located in the region 10 is a road network 12.

A traffic broadcast system 20 is also located in the region 10. The traffic broadcast system 20 transmits data 50 regarding traffic and road conditions in the region 10, sometimes referred to as traffic messages. The traffic broadcast system 20 may be operated by a governmental organization or may be privately operated. The traffic broadcasting system 20 may broadcast messages that conform to a traffic message channel protocol, such as TMC, carried over RDS, RBDS, VICS, DAB, DMB, DRM, HD Radio, and so on. Alternatively, the traffic broadcasting system 20 may use non-broadcast transmissions using, for example, GPRS and TDM.

Vehicles 11A, 11B, 11C, 11D . . . 11*n* travel on the road network 12 in the region 10. The vehicles 11 may include a variety of cars, trucks, and motorcycles. Some or all of the vehicles 11 include suitable equipment that enables them to receive the data 50 transmitted by the traffic broadcast system 20.

The data 50 transmitted from the traffic broadcast system 20 may also be received and used in systems 80 that are not installed in vehicles (referred to herein as "non-vehicle systems"). These non-vehicle systems 80 may include workstations, personal computers, tablet computers, televisions, radio receivers, telephones, and so on. The non-vehicle systems 80 may receive the data 50 in the same manner as the vehicles, for example, by broadcast over a traffic message channel. Alternatively, the non-vehicle systems 80 may receive the data 50 by other means, such as over telephone lines, over the Internet, via cable, and so on. The systems in the vehicles 11 and the non-vehicle systems 80 that receive the data 50 may include various different computing platforms.

Figure 2:
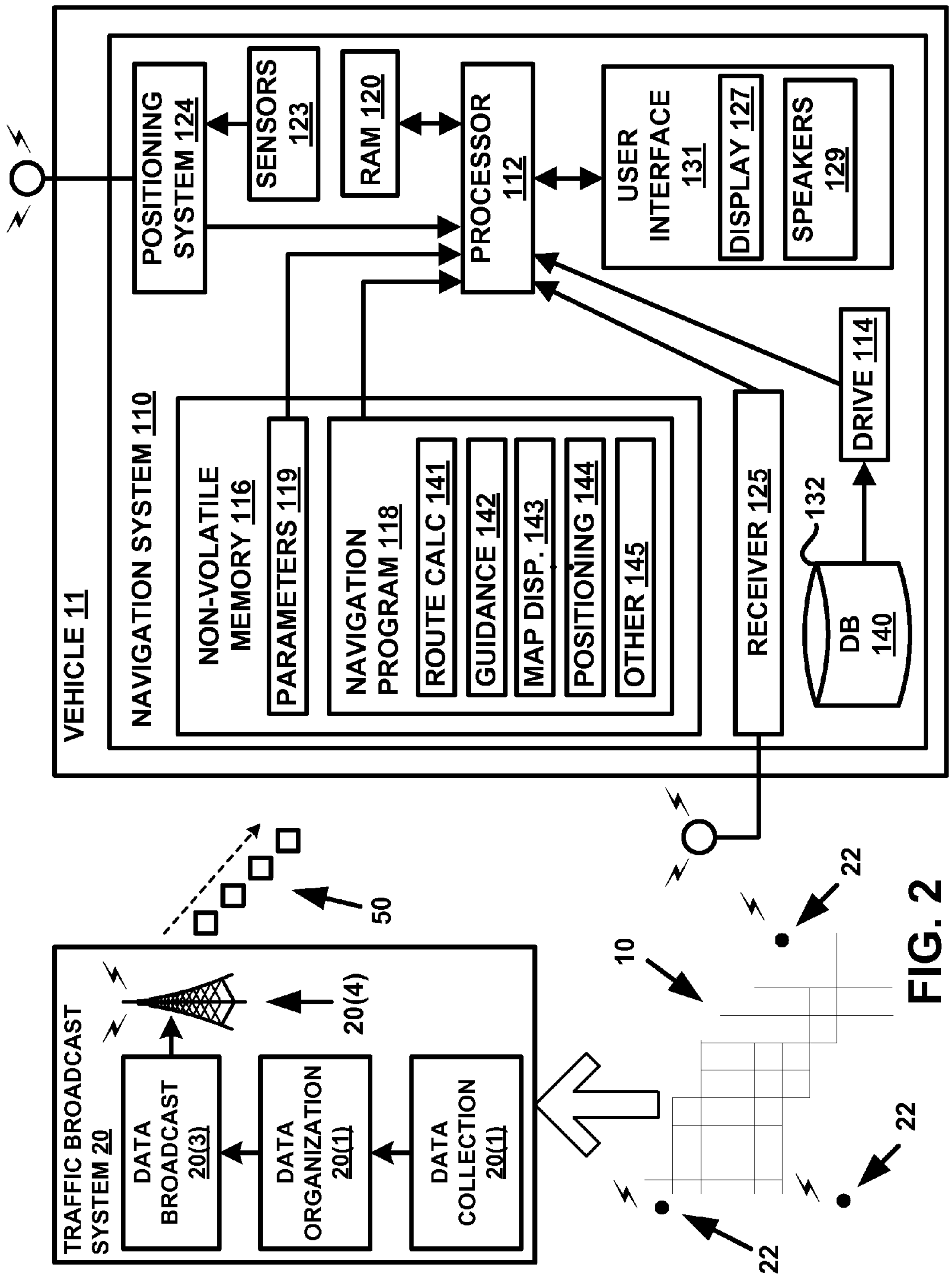
FIG. 2 is a block diagram illustrating components of the traffic broadcast system and one of the vehicles with an on-board navigation system, as shown in FIG. 1, according to an example.

FIG. 2 shows the components of the traffic broadcast system 20 and one of the vehicles 11 shown in FIG. 1. The traffic broadcast system 20 provides for the collection of data relating to traffic and road conditions, the analysis and organization of these collected data, the formatting of the analyzed data into traffic messages, and the transmission of these traffic messages to the vehicles 11 in the region 10 on a regular and continuing basis.

The traffic broadcast system 20 uses various means 22 to obtain information about traffic and road conditions. These means 22 may include sensors located in or near the roads in the road network 12, aerial sensors, sensors in vehicles 11, radar, as well as other technologies. A traffic operator located at the traffic broadcast system 20 may also obtain information about traffic and road conditions by communicating with surveillance aircraft or vehicles, local departments of transportation, traffic management centers, other agencies, and individuals; and listening to scanners on police, fire, and emergency frequencies.

The traffic broadcast system 20 includes equipment and programming 20(1) for collecting the data relating to traffic and road conditions in the region 10 from the various sensors 22. This equipment and programming 20(1) includes, for example, various communications links (including wireless links), receivers, data storage devices, programming that saves the collected data, programming that logs data collection times and locations, and so on.

The traffic broadcast system 20 also includes equipment and programming 20(2) for assembling, organizing, analyzing, and formatting the collected traffic and road condition data. This programming and equipment 20(2) includes storage devices, programming that statistically analyzes the collected data for potential errors, programming that organizes the collected data, and programming that uses the data to prepare messages in one or more appropriate predetermined formats.

The traffic broadcast system 20 also includes suitable equipment and programming 20(3) for transmitting the data 50. The data 50 can be the traffic and road condition data collected and organized by the traffic broadcast system 20 and/or additional data. The equipment and programming 20(3) includes interfaces to transmitters, programming that communicates formatted messages at regular intervals to the transmitters, and so on.

The traffic broadcast system 20 also includes transmission equipment 20(4). This equipment 20(4) may comprise one or more FM, AM, DAB, DRM or other transmitters, including antennas, or other wireless transmitters. This equipment 20(4) provides for transmitting the messages as data 50 throughout the region 10. The transmitting equipment 20(4) may be part of the traffic broadcast system 20, or alternatively, the traffic broadcast system 20 may use equipment from other types of systems, such as cellular systems, FM radio stations, and so on, to transmit the data 50 to the vehicles 11 in the region 10. The transmitting of data 50 includes any form of transmission, including direct wireless transmission.

Figure 3:
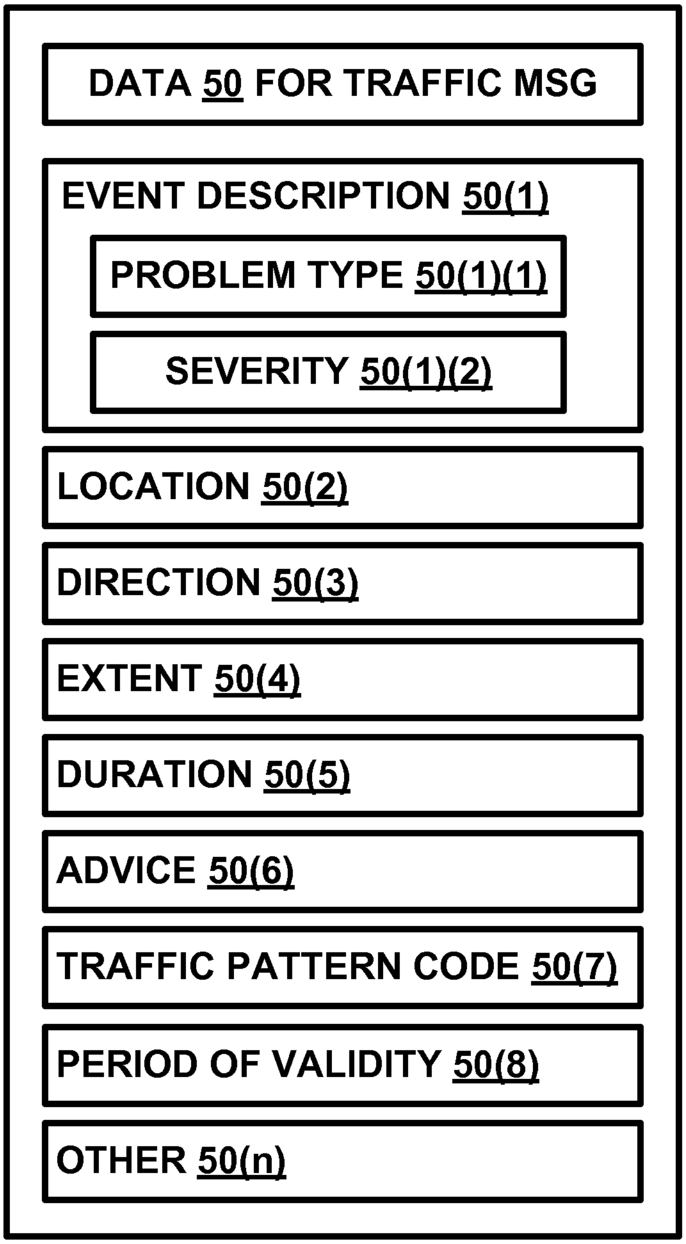
FIG. 3 is a diagram illustrating data included in a traffic message, according to an example.

FIG. 3 illustrates the data 50 for an example traffic message. The traffic message can include various kinds of data 50. In the example shown in FIG. 3, the data 50 includes the following data components: an event description 50(1), a location 50(2), a direction 50(3), an extent 50(4), a duration 50(5), advice 50(6), traffic pattern code 50(7), and period of validity (8). The data 50 for the traffic message may also include components that provide other information 50(*n*).

The event description component 50(1) includes data that describe a type of traffic problem 50(1)(1) along with data that describe a level of severity 50(1)(2) of the traffic problem. The location component 50(2) includes a reference number that identifies the location of the traffic problem. The direction component 50(3) includes data that indicate the direction of traffic affected. The extent component 50(4) includes data that identify a length of a traffic congestion queue with respect to the location 50(2). The extent component 50(4) implicitly defines another (e.g., a secondary location) straddling the traffic condition in terms of the number of location references in between. The advice component 50(6) provides a recommendation for a diversion of route.

The traffic pattern code 50(7) includes an identifier that a receiving device can use to retrieve a traffic pattern from memory. The period of validity 50(8) identifies the period of time that the receiving device should use the traffic pattern identified by the code 50(7) instead of a traffic pattern selected by day of week and time of day.

The traffic pattern code 50(7) and the period of validity 50(8) may also be transmitted separately from a traffic message. For example, the traffic pattern code 50(7) and the period of validity 50(8) may be transmitted alongside the traffic message to end-users of a traffic message receiver. By "alongside" it is meant that the traffic pattern code 50(7) and the period of validity 50(8) use a different protocol than the traffic message, but co-exist within the same transmission.

In one example, the protocol used for the traffic message is the RDS-TMC protocol, which is used on both RDS and RBDS systems, and the protocol used for the traffic pattern code 50(7) and the period of validity 50(8) is a proprietary protocol. The proprietary protocol is recognized by a traffic message receiver by registering the protocol as an Open Data Application ("ODA") as described in the RDS/RBDS standard. Upon registration, an application identifier ("AID") is assigned to the protocol. The traffic message receiver recognizes the application identifier without modifying the receiver.

Moreover, the traffic pattern code 50(7) and the period of validity 50(8) may be transmitted directly to a device, such as a navigation system. For example, the traffic pattern code 50(7) and the period of validity 50(8) may be transmitted to a navigation system using GPRS or TDM. Other wireless transmission protocols may be used as well. In this example, other information, such as location 50(2), direction 50(3), and extent 50(4), may be transmitted directly to the navigation system with the traffic pattern code 50(7) and the period of validity 50(8).

II. Navigation System Overview

FIG. 2 also depicts the components of one of the vehicles 11 shown in FIG. 1. The vehicle 11 may be a car, a truck, a motorcycle, or any other type of vehicle in the region 10. A navigation system 110 is installed in the vehicle 11. The navigation system 110 is a combination of hardware and software components. In one embodiment, the navigation system 110 includes a processor 112, a drive 114 connected to the processor 112, and a non-volatile memory storage device 116 for storing a navigation application software program 118 and possibly other information. The processor 112 may be any type of processor suitable for navigation systems.

The navigation system 110 may also include a positioning system 124. The positioning system 124 may utilize GPS-type technology, a dead reckoning-type system, or combinations of these or other positioning systems. The positioning system 124 may include suitable sensing devices 123 that measure the traveling distance, speed, direction, and so on of the vehicle 11. The positioning system 124 may also include appropriate technology to obtain a GPS signal, in a manner which is known in the art. The positioning system 124 outputs a signal to the processor 112. The signal from the positioning system 124 may be used by the navigation application software 118 that is run on the processor 112 to determine the location, direction, speed, and so on of the vehicle 11.

The vehicle 11 includes a receiver 125. The receiver 125 receives the data 50 from the traffic broadcast system 20. For example, the receiver 125 may be an FM receiver tuned to the appropriate frequency at which the traffic broadcast system 20 is using to broadcast the data 50. As another example, when the data 50 are sent by direct wireless transmission, such as cellular wireless transmission, the receiver 125 in the vehicle 11 may be similar or identical to a cellular telephone. The receiver 125 provides an output to the processor 112 so that appropriate programming in the navigation system 110 can utilize the data 50 transmitted by the traffic broadcast system 20 or another type of broadcast system when performing navigation functions.

Figure 4:
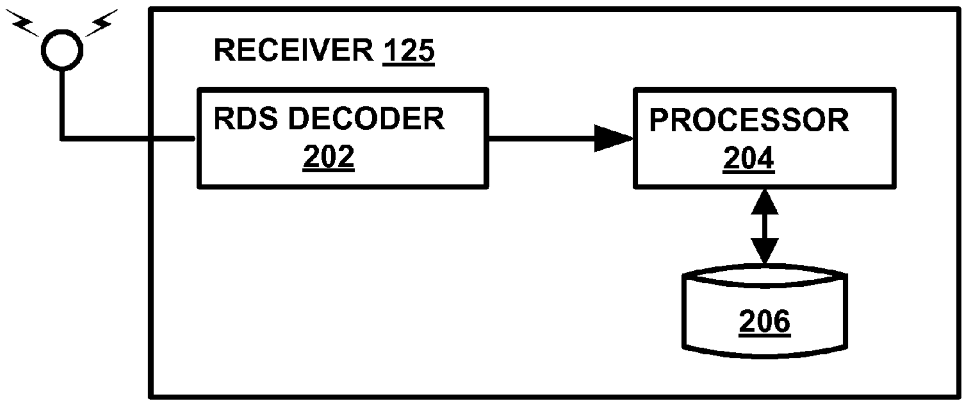
FIG. 4 is a block diagram illustrating a receiver, as shown in FIG. 2, according to an example.

FIG. 4 is a simplified block diagram of the receiver 125 that may be used in the navigation system 110 depicted in FIG. 2. In this example, the receiver 125 is an RDS receiver. However, receiver design depends on the type of traffic broadcast system 20 transmitting the data 50 and, thus, the receiver 125 is not limited to any particular type of receiver. The receiver 125 includes an RDS decoder 202 that receives and formats the data 50. The RDS decoder 202 provides the formatted data to a processor 204. The processor 204 interprets the data and determines what action to take based on the data. For example, the processor 204 may read data from or write data to memory 206. The memory 206 is not limited to any memory type.

While FIG. 4 depicts the receiver 125 having its own processor 204 and memory 206, it is understood that the receiver 125 may share processing and memory with the navigation system 110 (i.e., an integrated system). For example, the receiver 125 may use the processor 112 and the non-volatile memory 116. Moreover, the receiver 125 may have additional components not depicted in FIG. 4.

Returning to FIG. 2, the navigation system 110 also includes a user interface 131. The user interface 131 includes appropriate equipment that allows the end-user (e.g., the driver or passengers) to input information into the navigation system 110. This input information may include a request to use the navigation functions of the navigation system 110. For example, the input information may include a request for a route to a desired destination, such as a point of interest. The input information may also include requests for other kinds of information.

The user interface equipment used to input information into the navigation system 110 may include a keypad, a keyboard, a microphone, and so on, as well as appropriate software, such as a voice recognition program. The user interface 131 also includes suitable equipment that provides information back to the end-user. This equipment may include a display 127, speakers 129, and other communication means.

The navigation system 110 uses a map database 140 stored on a storage medium 132. In one example, the storage medium 132 is installed in the drive 114 so that the map database 140 can be read and used by the navigation system 110. The storage medium 132 may be removable and replaceable so that a storage medium with an appropriate map database for the geographic region in which the vehicle is traveling can be used. In addition, the storage medium 132 may be replaceable so that the map database 140 on it can be updated easily. In one embodiment, the geographic data 140 may be a geographic database published by NAVTEQ North America, LLC of Chicago, Ill.

In one example, the storage medium 132 is a CD ROM disk. In another example, the storage medium 132 may be a PCMCIA card in which case the drive 114 would be substituted with a PCMCIA slot. Various other storage media may be used, including fixed or hard disks, DVD disks, or other currently available storage media, as well as storage media that may be developed in the future.

The storage medium 132 and the geographic database 140 do not have to be physically provided at the location of the navigation system 110. In some examples, the storage medium 132, upon which some or all of the geographic data 140 are stored, may be located remotely from the rest of the navigation system 110 and portions of the geographic data provided via a communications link, as needed.

In one type of system, the navigation application software program 118 is loaded from the non-volatile memory 116 into a Random Access Memory ("RAM") 120 associated with the processor 112 in order to operate the navigation system 110. The processor 112 also receives input from the user interface 131. The input may include a request for navigation information. The navigation system 110 uses the map database 140 stored on the storage medium 132, possibly in conjunction with the outputs from the positioning system 124 and the receiver 125, to provide various navigation functions.

The navigation application software program 118 may include separate applications (or subprograms) that provide these various navigation features and functions. These functions may include route calculation 141 (wherein a route to a destination identified by the end-user is determined), route guidance 142 (wherein detailed directions are provided for reaching a desired destination), map display 143, and vehicle positioning 144 (i.e., map matching). Other functions and programming 145, in addition to these, may be included in the navigation system 110. The navigation application program 118 may be written in a suitable computer programming language such as C, C++, and Java. Other computer programming languages are also suitable.

Figure 5:
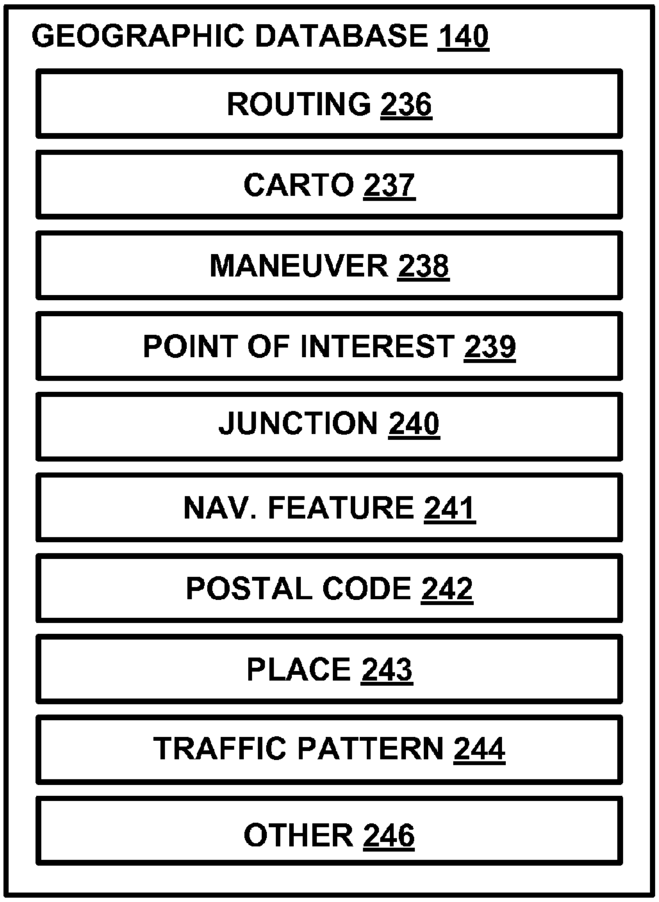
FIG. 5 is a block diagram illustrating an organization of data in the geographic database depicted in FIG. 2, according to an example.

FIG. 5 is a block diagram showing an example organization of data in the geographic database 140 depicted in FIG. 2. In this example, the geographic database 140 is organized by data type. One way that the accessing of geographic data can be enhanced for performing various navigation functions is to provide separate collections or subsets of the geographic data 140 for use by each of the separate functions (e.g., 141-145) in the navigation application program 118. Each of these separate subsets is tailored specifically for use by one of the functions.

For instance, the route calculation function 141 normally requires only a portion of all the information in the geographic database 140 that is associated with a segment of a road. When the route calculation function 141 is being run, it may require information such as the speed along a road segment, turn restrictions from one road segment to another, and so on. However, the route calculation function 141 does not necessarily require the name of the road to calculate a route.

Similarly, when the route guidance function 142 is being run, some of the information associated with a segment of a road, such as the speed and turn restrictions, is not required. Instead, when the route guidance function 142 is being run, it uses information that includes the name of the road represented by the road segment, the address range along the road segment, any signs along the road segment, and so on.

Even further, when using the map display function 143, some of the information associated with a road segment, such as the speed limits or turn restrictions, is not required. Instead, when the map display function 143 is run, it uses only a portion of the information associated with the road segment, such as the shapes and locations of roads, and possibly the names of the roads.

Although there may be some overlap as to the types of information used by the various navigation functions, some of the data used by these navigation functions is only used by one of the functions. If all the information relating to each road segment were associated with it as a single data entry in a single database, each data entity record would be relatively large. Thus, whenever any one of the navigation functions accessed an entity record, it would have to read into memory a significant amount of information much of which would not be needed by the navigation function. Moreover, when reading the data entity from disk, relatively few data entities could be read at a time since each data entity would be relatively large.

In order to provide the information in the geographic database 140 in a format more efficient for use by each of the navigation functions, separate subsets of the entire geographic database 140 for a given geographic region are provided for each of the different types of navigation functions to be provided in the navigation application program 118. FIG. 5 illustrates the geographic database 140 comprised of separate routing data 236 (for route calculation), cartographic data 237 (for map display), maneuver data 238 (for route guidance), point-of-interest data 239 (for identifying specific points of interest, such as hotels, restaurants, museums, stadiums, airports, etc.), and junction data 240 (for identifying named intersections).

In addition to these types of data, the geographic database 140 may include navigation feature data 241. This subset of data includes names of navigable features (such as roads). The geographic database may also include data subsets for postal codes 242 and places 243 (e.g., cities, states, and counties).

The geographic database 140 may also include traffic pattern data 244. The traffic pattern data 244 includes a traffic pattern code that identifies a particular traffic pattern. The traffic pattern code can be any combination of numbers, letters, and symbols. A traffic pattern is associated with each traffic pattern code. A traffic pattern is data the represents the expected traffic speeds by day of the week and time of the day.

The traffic pattern data associated with a traffic pattern code (e.g., XY3Z!) may be organized in table format as shown in Table 1 as follows.

TABLE 1

| Data Associated With Traffic Pattern XY3Z! | | | |
|---|---|---|---|
| Day Code | Time Period 1 | . . . | Time Period n |
| Monday | 55 mph | . . . | 65 mph |
| 02 | 34 kph | . . . | 20 kph |
| . . . | . . . | . . . | . . . |

Column 1 of Table 1 includes a day code. The day code column includes data associated with days of the week and other days of interest. For example, the days of the week may be represented numerically (e.g., Sunday=1, . . . Saturday=7). As another example, the other days of interest may be assigned numerical codes, such as 100=Thanksgiving, 200=Easter Sunday, and so on. Other coding schemes may also be used to identify days of the week and other days of interest.

The remaining columns of Table 1 include time period data. The time period columns include data associated with a speed value for a period of time. For example, the period of time may be fifteen minutes. In this example, there are ninety-six time periods, each associated with a speed value. Other time period durations may also be used. The speed value may be a number representing an average speed (e.g., miles per hour (MPH), kilometers per hour (KPH), meters per second (MPS)) for the time period measured at the associated location. The speed value may also represent other values, such as the median speed for the time period measured at the associated location.

Figure 6:
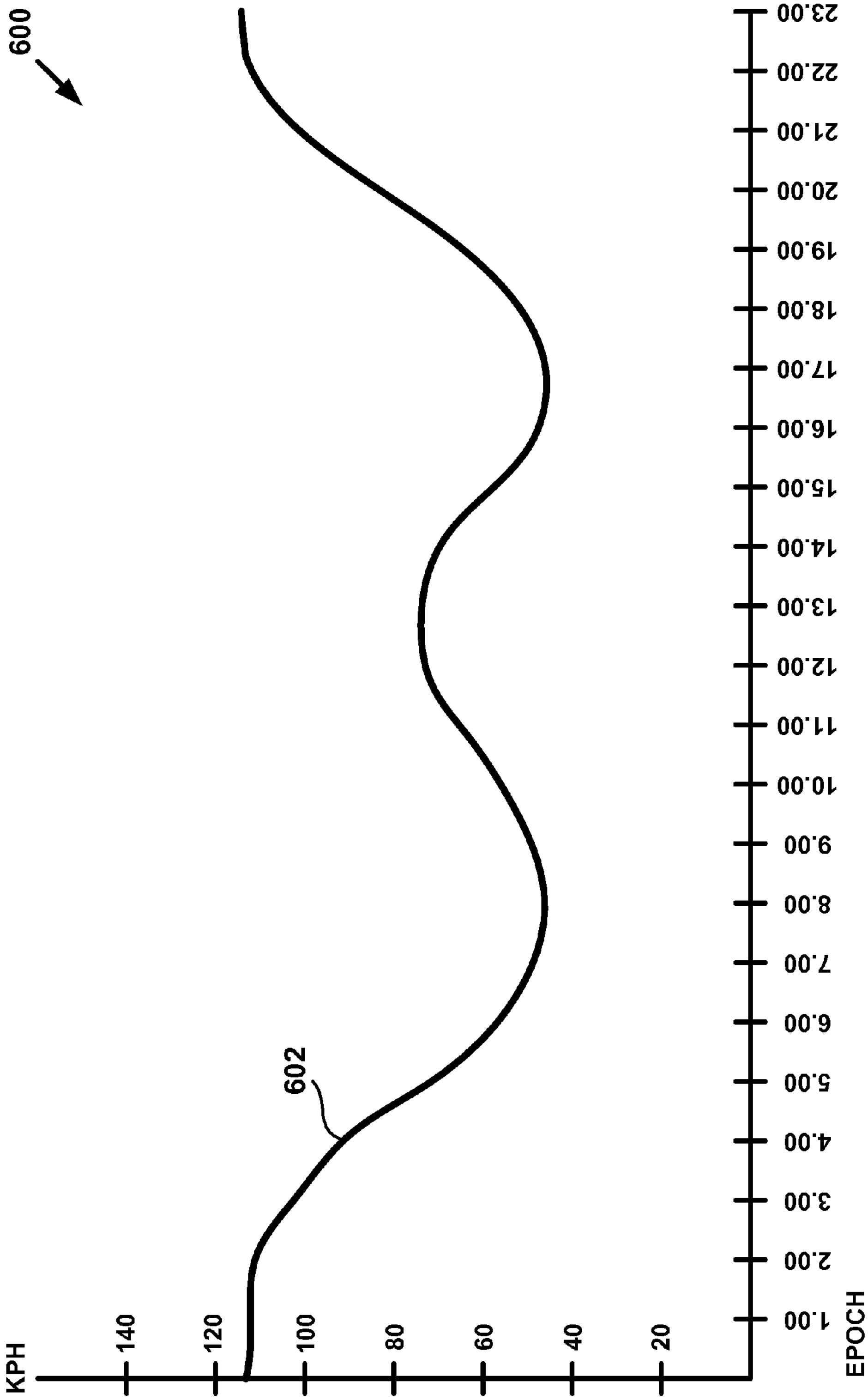
FIG. 6 is a graph depicting an example traffic pattern.

The traffic pattern data 244 may also be represented by a traffic pattern code associated with a graph that represents expected travel times. FIG. 6 is a graph 600 that depicts an example traffic pattern 602. The traffic pattern 602 is defined as the speed values in time period order, which comprises an entire day for a given location code.

While the traffic pattern data 244 is shown stored in the geographic database 140, it is understood that the traffic pattern data 244 may also be stored in a separate database.

The traffic pattern data 244 is associated with one or more locations. The locations may be represented by geographical coordinates (e.g., latitude, longitude, and optionally altitude), traffic codes (e.g., Radio Data System Traffic Message Channel (RDS-TMC) codes and Vehicle Information and Communication System (VICS) codes), road segment identifications, grid or tile identifications, and/or any other method of identifying a physical location on or adjacent to a road network in the real world.

The traffic pattern data 244 may be associated with roads having different functional classes. For example, a road associated with functional class 5 may include high volume, controlled access roads, such as expressways and freeways. Roads associated with functional class 4 may be high volume roads with few speed changes, but are not necessarily controlled access roads. The lower ranked roads handle correspondingly lower volumes and generally have more speed changes or lower speeds. Real-time traffic data may only be available for some road classifications, such as functional class 4 and 5. The traffic pattern data 244 may be associated with the lower functional class roads as well as roads associated with functional class 4 and 5.

The geographic database 140 may not include all of these subsets. Moreover, the geographic database 140 may include other subsets of data 246.

III. Selecting a Traffic Pattern

Figure 7:
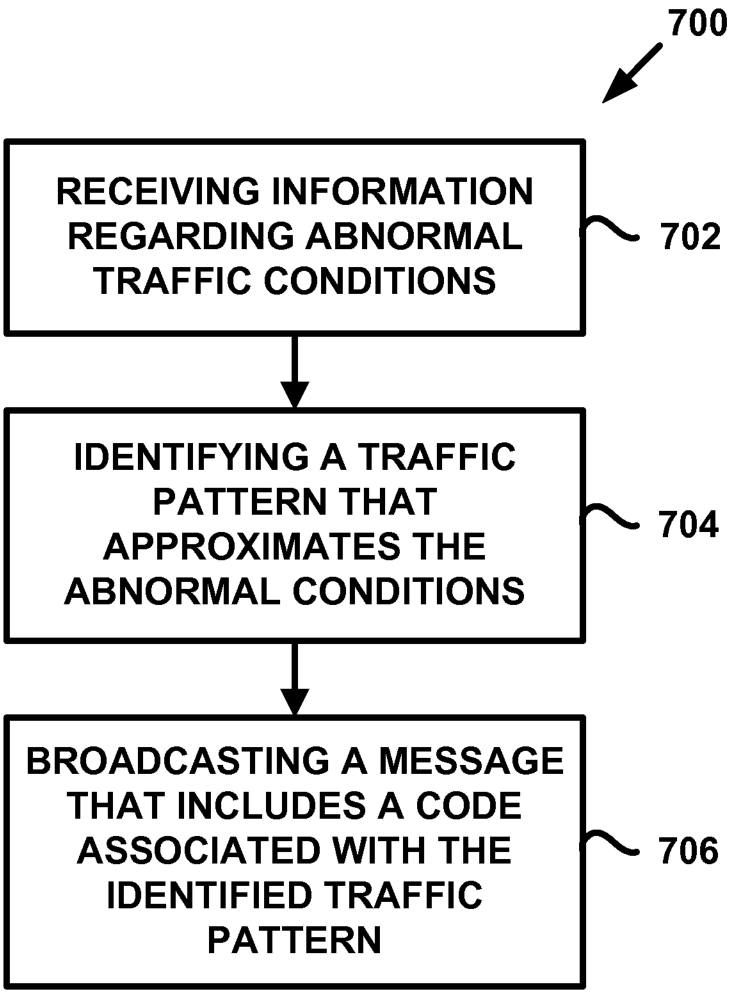
FIG. 7 is a flowchart of a method for selecting a traffic pattern, according to an example.

FIG. 7 is a flowchart of a method 700 for selecting one or more traffic patterns when traffic conditions are abnormal at a location. Abnormal traffic conditions for a location are traffic conditions differing from the traffic pattern data 244 associated with the location at a current time period. During normal traffic conditions, the navigation system 110 uses the traffic pattern data 244 associated with the location and current time period. However, during abnormal traffic conditions occurring at the location, the traffic pattern associated with the location is not representative of traffic conditions.

At block 702, the traffic broadcast system 20 receives information regarding abnormal traffic conditions for a particular section of a road network. The abnormal conditions may be that traffic is moving faster or slower than expected. The abnormal conditions may be caused by a traffic accident, construction, weather conditions, special events, sporting events, and so on. The traffic broadcast system 20 may receive the information regarding the abnormal conditions from the sensors 22 or other communication means, such as communication from local departments of transportation, emergency responders, and other agencies.

At block 704, the traffic broadcast system 20 identifies a traffic pattern that approximates the abnormal conditions. The traffic broadcast system 20 identifies an existing traffic pattern that is associated with other locations during normal traffic conditions. For example, if the traffic pattern assigned to the current time period for a location indicates an expected travel time of 45 mph and the current travel time for the location is 30 mph, the traffic broadcast system 20 identifies a traffic pattern that indicates an expected travel time of 30 mph for the current time period. If there is more than one traffic pattern that indicates an expected travel time of 30 mph for the current time period, the traffic broadcast system 20 may select the traffic pattern that is expected to most closely match conditions in the subsequent time periods.

At block 706, the traffic broadcast system 20 transmits a message that includes a code associated with the traffic pattern identified at block 704. The traffic broadcast system 20 may broadcast a traffic message 50 that includes the traffic pattern code 50(7). Alternatively, the traffic broadcast system 20 may broadcast the traffic pattern code alongside a traffic message using a proprietary protocol registered as an ODA. As yet another example, the traffic broadcast system 20 may send the traffic pattern code by direct wireless transmission (i.e., non-broadcast mode), such as a cellular wireless transmission (e.g., using GPRS or TDM). In this example, the traffic broadcast system 20 may transmit additional data to identify where abnormal traffic conditions are occurring.

Regardless of transmission type, the message may also include a period of validity. The period of validity identifies how long the traffic pattern associated with the traffic pattern code in the message should be used by the receiving device. The period of validity may include a time (e.g., 19:15-19:30) or a code that represents a period of time.

Alternatively, the receiving device, such as the navigation system 110, may use a default period of validity. For example, the navigation system 110 may use a default duration of 30 minutes. If the navigation system 110 does not receive another message from the traffic broadcast system 20 within the thirty minutes, the navigation system 110 reverts back to using traffic patterns based on day of week and time of day.

Transmitting the message with the traffic pattern code reduces the transmission costs as compared to the costs associated with transmitting real-time traffic data. Moreover, the message with the traffic pattern code may be transmitted for a class of road that is not typically associated with real-time traffic data. Thus, the navigation system receives timely updates with minimum cost.

Figure 8:
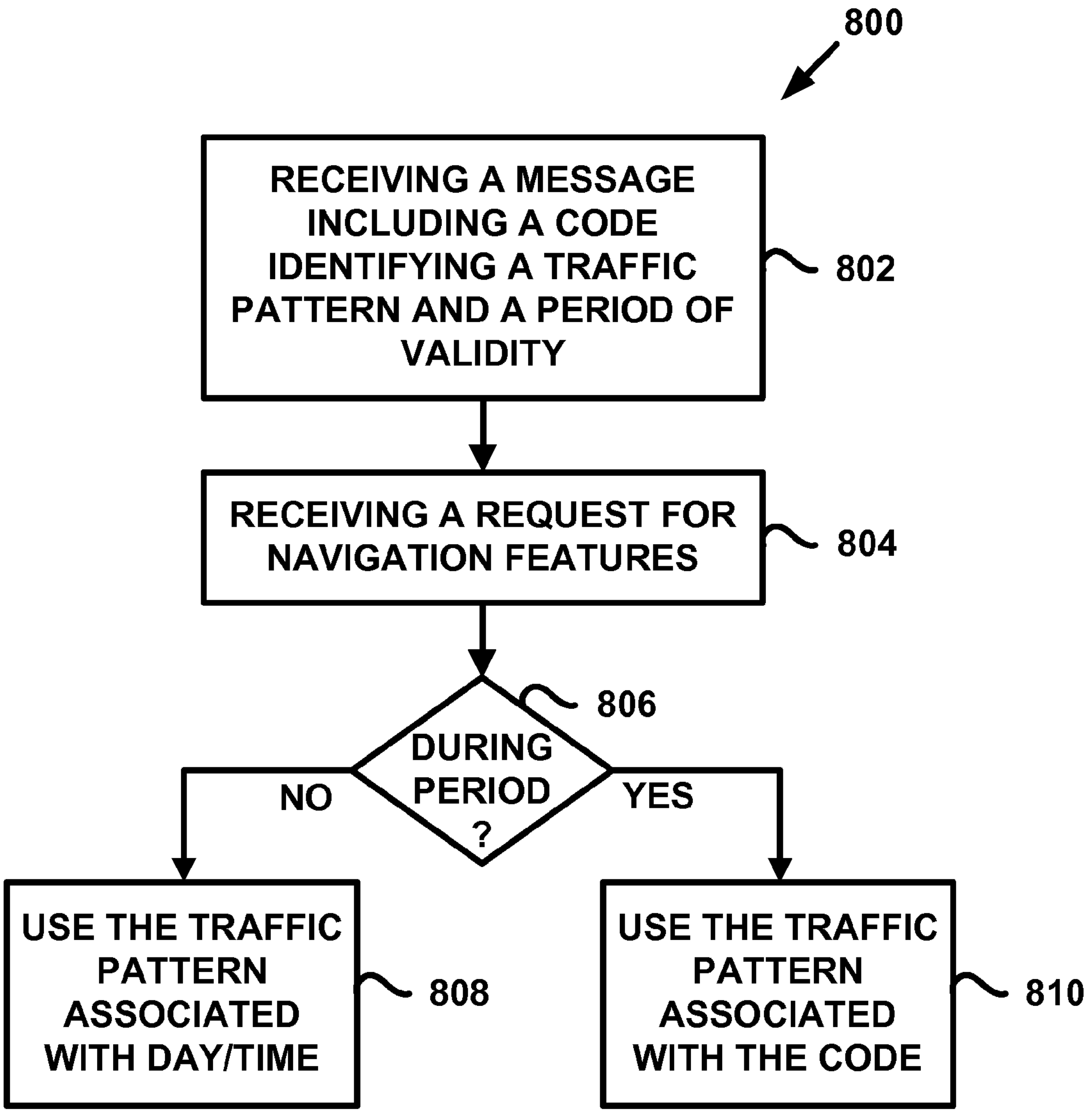
FIG. 8 is a flowchart of a method for using a traffic pattern based on a received traffic pattern code, according to an example.

FIG. 8 is a flowchart of a method 800 for receiving a code identifying a traffic pattern. For example, the navigation system 110 may receive one or more traffic pattern codes from the traffic broadcast system 20 using the method 700. Of course, other systems may receive traffic pattern codes, such as a mobile telephone, a tablet computer, and a personal computer.

At block 802, the navigation system 110 receives a message that includes one or more traffic pattern codes. The message may also include a period of validity for using the traffic patterns associated with the codes. The message may also include data identifying the location of the abnormal traffic conditions. The receiver 125 of the navigation system 110 may receive the message via a wireless communication link.

At block 804, the navigation system 110 receives a request for navigation features. For example, a user of the navigation system 110 may request a route from an origin to a destination. As another example, the user may request a map showing the user's current location. As yet another example, the user may request an estimated time to travel to a location and/or an estimated time of arrival at the location. Further still, the user may request a departure time to arrive at a location by a certain time.

At block 806, the navigation system 110 determines whether the request for navigation features is received during the period of validity included in the message or a default time period previously stored in the navigation programming 118. If not, at block 808, the navigation system 110 selects one or more traffic patterns 244 stored in the geographic database 140 based on day of the week and time of the day to provide the navigation functions. If so, at block 810, the navigation system 110 selects one or more traffic patterns 244 stored in the geographic database 140 based on the traffic pattern code(s) received in the message at block 802.

The traffic patterns selected at block 808, 810 may be used to calculate a route. The route calculation program 141 calculates a route from a starting point (also referred to as an origin) to a destination. The route calculation program 141 may use any suitable routing algorithm, such as the Dijkstra algorithm or the A* algorithm.

The route calculation program 141 uses a cost to identify an optimal route. Here, cost refers to a user's preference for a route. For example, the user may desire the shortest route, the fastest route, or the most energy efficient route for traveling from an origin to a destination. The route calculation program 141 may use the traffic pattern as a cost in calculating the fastest route and the most energy efficient route. The route calculation program 141 may also use the traffic pattern to calculate an estimate time for traveling from the origin to the destination, an estimated time of arrival, and a departure time to arrive at the destination by or before a certain arrival time.

The route calculation program 141 may also re-calculate the route if the user of the navigation system 110 is currently following a route and the navigation system 110 receives a message with a traffic pattern code. After performing the re-calculation, the navigation system 110 may provide the user with an option of routes along with the expected travel times associated with the routes allowing the user to choose whether to change routes. Alternatively, the navigation system 110 may select which route to use when providing route guidance.

The map display program 143 may use the traffic patterns to display a map that includes traffic information. For example, the map display program 143 may display a map where the roads are color-coded green, yellow, and red to indicate traffic conditions. After the navigation system 110 receives a message with a traffic pattern code, the map display program 143 may update the color for a portion of the road network impacted by the abnormal traffic conditions.

Once the period of validity for the traffic pattern code expires, the navigation system 110 reverts back to selecting traffic patterns based on day of the week and time of the day. Beneficially, the navigation system 110 only stores one traffic pattern database. The navigation system 110 does not need to store and update an event calendar. Moreover, the navigation system 110 does not need to assign more than one traffic pattern to a segment (i.e., the normal traffic pattern and one or more abnormal traffic patterns). Instead, as unusual conditions occur, the navigation system 110 receives a message identifying a traffic pattern that is already stored in the geographic database 140 to use for a period of time instead of the usual traffic pattern.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A computer-implemented method for using a transmitted traffic pattern code, comprising:

accessing a first code from memory based on a current time, wherein the first code identifies a first traffic pattern;

providing navigation system functions according to the first traffic pattern from the first code;

receiving a message from a broadcast, wherein the message includes a second code identifying a second traffic pattern, a period of validity, and a location of a section of a road network;

during the period of validity, using the traffic pattern identified by the second code to perform navigation system functions associated with traveling in the section of the road network; and reverting to the first code for the location of the section of the road network after the period of validity.

2. The method of claim 1, wherein the navigation system functions include route calculation.

3. The method of claim 1, wherein the navigation system functions include calculating a travel time.

4. The method of claim 1, wherein the navigation system functions include map display depicting traffic conditions.

5. The method of claim 1, wherein the navigation system functions include map display depicting traffic conditions.

6. A computer-implemented method for performing route calculation, comprising:

accessing a first traffic pattern based on a day and a time;

calculating a route to a destination using the first traffic pattern as a cost;

receiving a broadcast from a wireless traffic broadcast system, wherein the broadcast includes a message including a traffic pattern code;

selecting, for a period of validity, a second traffic pattern based on the traffic pattern code in response to receipt of the message;

calculating a route to the destination using the second traffic pattern as the cost during the period of validity; and calculating a route to the destination using the first traffic pattern as a cost after the period of validity elapses.

7. A computer-implemented method for selecting a traffic pattern for broadcast, comprising:

receiving information regarding abnormal traffic conditions for a location, wherein the abnormal traffic conditions are traffic conditions that differ from a traffic pattern associated with the location;

identifying a traffic pattern not associated with the location that approximates the abnormal traffic conditions, wherein the traffic pattern not associated with the location is associated with a code;

assigning a period of validity for the code for the traffic pattern not associated with the location; and broadcasting a message over a radio data systems traffic message channel, wherein the message includes the period of validity and the code associated with the traffic pattern not associated with the location, wherein the traffic pattern not associated with the location replaces the traffic pattern associated with the location in a navigation system during the period of validity.

* * * * *